US009702543B2

(12) United States Patent
Cochrane et al.

(10) Patent No.: US 9,702,543 B2
(45) Date of Patent: Jul. 11, 2017

(54) METHOD FOR CONTROLLING COMBUSTION GAS OUTPUT IN DIRECT STEAM GENERATION FOR OIL RECOVERY

(71) Applicant: QSI TECHNOLOGIES INC., Red Deer (CA)

(72) Inventors: Patrick Cochrane, Red Deer (CA); Norman Arrison, Red Deer (CA); Charles E. Slavens, Red Deer (CA); Ronald Foster, Red Deer (CA)

(73) Assignee: QSI TECHNOLOGIES INC., Red Deer (CA)

( * ) Notice: Subject to any disclaimer, the term of this patent is extended or adjusted under 35 U.S.C. 154(b) by 0 days.

(21) Appl. No.: 15/175,841

(22) Filed: Jun. 7, 2016

(65) Prior Publication Data

US 2016/0290628 A1 Oct. 6, 2016

Related U.S. Application Data

(62) Division of application No. 14/303,352, filed on Jun. 12, 2014, now Pat. No. 9,447,667.

(30) Foreign Application Priority Data

May 29, 2014 (CA) ...................................... 2853115

(51) Int. Cl.
*E21B 43/24* (2006.01)
*F22B 1/18* (2006.01)
(Continued)

(52) U.S. Cl.
CPC ............ *F22B 1/1853* (2013.01); *E21B 34/06* (2013.01); *E21B 36/02* (2013.01); *E21B 43/164* (2013.01);
(Continued)

(58) Field of Classification Search
CPC .... F22B 1/853; E21B 43/2408; E21B 43/164; E21B 43/24
(Continued)

(56) References Cited

U.S. PATENT DOCUMENTS 3,354,958 A * 11/1967 Parker ..................... E21B 43/24
166/303
4,211,071 A   7/1980 Wyatt
(Continued)

FOREIGN PATENT DOCUMENTS

| CA | 2514073 | 8/2004 |
|---|---|---|
| WO | 2007081816 | 7/2007 |

OTHER PUBLICATIONS

PCT/CA2015/050466, International Search Report and Written Opinion; Aug. 24, 2015.
(Continued)

*Primary Examiner* — Silvana Runyan
(74) *Attorney, Agent, or Firm* — Morgan, Lewis & Bockius LLP

(57) ABSTRACT

An apparatus, system, and method for controlling combustion gas output in direct steam generation for oil recovery. A direct combustion steam generator burns a fuel and an oxygen-containing gas mixture to produce combustion products including steam, $CO_2$ and $N_2$. Supplemental oxygen is separately supplied to the combustion steam generator to adjust the oxygen content of the oxygen-containing gas mixture during the combustion process in order to adjust the ratio of $CO_2$ to $N_2$ produced in the combustion products.

21 Claims, 5 Drawing Sheets

(51) Int. Cl.
| | |
|---|---|
| *E21B 34/06* | (2006.01) |
| *E21B 36/02* | (2006.01) |
| *E21B 43/30* | (2006.01) |
| *F22B 27/00* | (2006.01) |
| *E21B 43/16* | (2006.01) |

(52) U.S. Cl.
CPC .......... *E21B 43/24* (2013.01); *E21B 43/2406* (2013.01); *E21B 43/2408* (2013.01); *E21B 43/30* (2013.01); *F22B 27/00* (2013.01)

(58) Field of Classification Search
USPC .................................... 166/303, 302, 305.1
See application file for complete search history.

(56) References Cited

U.S. PATENT DOCUMENTS

| | | | | |
|---|---|---|---|---|
| 4,498,542 | A * | 2/1985 | Eisenhawer | E21B 36/025 166/303 |
| 6,135,063 | A * | 10/2000 | Welden | F22B 1/26 122/446 |
| 7,814,867 | B2 | 10/2010 | Betzer Tsilevich | |
| 8,353,342 | B2 | 1/2013 | Latimer | |
| 2006/0243448 | A1 * | 11/2006 | Kresnyak | E21B 43/168 166/303 |
| 2010/0037835 | A1 * | 2/2010 | Betzer Tsilevich | F22B 1/1853 122/11 |
| 2014/0060825 | A1 | 3/2014 | Macadam | |

OTHER PUBLICATIONS

CA Office Action dated Aug. 19, 2016.
CA Office Action dated Aug. 19, 2015.

\* cited by examiner

METHOD FOR CONTROLLING COMBUSTION GAS OUTPUT IN DIRECT STEAM GENERATION FOR OIL RECOVERY

CLAIM OF BENEFIT TO PRIOR APPLICATION

This application claims priority to U.S. Pat. No. 9,447,667, filed Jun. 12, 2014 and issued Sep. 20, 2016, which in turn claims priority to Canadian Patent No. 2,853,115, filed May 29, 2014 and issued May 24, 2016, both of which are hereby incorporated by reference in their entirety.

FIELD OF THE INVENTION

Embodiments of the invention relate to apparatus, systems, and methods preferably for steam assisted oil recovery, but also for pre-cast concrete curing. In particular, the embodiments relate to methods and systems for generating an adjustably-variable gaseous stream containing steam and non-condensable gases in various proportions, for co-injection into a reservoir to enhance oil recovery, or to assist in concrete curing.

BACKGROUND OF THE INVENTION

Numerous steam assisted recovery processes are known for recovering bitumen from underground formation including Cyclic Steam Stimulation (CSS) and Steam Assisted Gravity Drainage (SAGD). Essentially, these steam-related processes involve the application of steam (i.e. heat) to a hydrocarbon-containing reservoir to reduce the viscosity of oil and/or bitumen therein and enhance its ability to flow. For example, during SAGD operations, steam introduced into a reservoir through a horizontal injector well transfers heat to the heavy oil upon condensation. The heavy oil with reduced viscosity due to this heating drains together with steam condensate and is recovered via a producer well disposed parallel and beneath the injector well.

Various techniques can provide for steam generation but the costs related to steam generation can often limit the economic feasibility of such techniques. Given the quantity of steam required for many of these steam-related processes, energy needed to generate the necessary heat for the steam generation represents a substantial cost. In addition, the associated environmental costs, including generation of greenhouse gases, can present severe limitations. In particular, the production of $CO_2$ emissions that contribute to greenhouse gas as well consumption of fresh water for the steam generation are parameters in existing steam generation techniques that need to be reduced to the maximum extent possible.

Direct combustion steam generation may facilitate lowering these costs due to improvements in efficiency, inherent makeup water replacement, and reduced emissions. Direct steam generation operates by burning a fuel in a combustor and preferably injecting water into the combustor to produce a mixture of generated steam and the combustion products from the steam generator for injection into a hydrocarbon-containing reservoir.

U.S. Pat. No. 8,353,342 describes a direct steam generation method and apparatus that includes both generating steam for injection into a wellbore and capturing $CO_2$ produced during steam generation in order to control $CO_2$ emissions. Specifically, a method of steam assisted recovery of oil is described that includes first reforming natural gas to produce $CO_2$ and hydrogen, followed by separating the $CO_2$ from the hydrogen. Oxygen is also separated from other air components. Steam is then generated by introducing the separated hydrogen and oxygen into a combustion area where the hydrogen and the oxygen are ignited then contacted with water in the combustion area. The steam that is produced is injected into an injection well and includes products from combustion of the hydrogen and the oxygen as well as the water vaporized by heat from the combustion. According to the described method, therefore, produced $CO_2$ is captured by sequestering the $CO_2$ independent of injecting the steam into the injection well.

More recently, the benefit of co-injecting the produced $CO_2$ with steam in direct steam generation techniques for oil recovery has been considered. In particular, the combustion gases, including $CO_2$ which may be miscible in the oil and further serve to reduce its viscosity by swelling of the oil through gas solubility, introduce additional recovery mechanisms to the viscosity reduction associated with the injection of steam alone. Still further additional recovery mechanisms include: increased reservoir pressure, and movement of oil via reduced viscous drag. Furthermore, the injection of combustion gases downhole can address the emissions issues that arise with conventional surface steam generators.

Importantly, however, while co-injecting $CO_2$ with steam may benefit steam-assisted oil recovery operations by lowering the steam to oil ratio, for example, the desired concentrations of the $CO_2$ within the steam to achieve such benefits for any particular steam-related oil production process may not, however, coincide with output from the direct steam generation.

International Patent Publication No. WO2007/081816 describes a direct combustion steam generator in which water is introduced into a vortex sustaining container and flows through the container in a spiraling manner to create a liquid vortex. The swirling water surrounds the flame and combustion is carried out inside the rotating body of water. The combustion product is achieved by supplying fuel and tangentially supplying an oxygen containing gas to a burner to produce the flame. Combustion is carried out using air enriched with oxygen at varying concentrations (or even pure oxygen) in order to provide a vapor stream consisting of steam and the desired level of $CO_2$. The hydrocyclone design of the generator is described as being capable of withstanding the flame temperatures encountered with combustion of fuel with oxygen or enriched air.

United States Patent Publication No. 2014/0060825 discloses the ability to control $CO_2$ levels in the output mixture of steam and $CO_2$, by controlling the temperature of the water fed to the steam generator. Specifically, a method of generating a mixture of steam and $CO_2$ is described as including supplying fuel and oxygen into a direct steam generator in addition to water that is heated to above 200° C. Combusting the fuel and oxygen in the direct steam generator as the preheated water is introduced, produces a mixture of steam and combustion products that has a $CO_2$ level in mass percent of steam below 11 percent.

A need continues to exist in the oil recovery industry for improved methods and systems for generating steam and non-condensable gases, such as $CO_2$ mixtures, for best optimized recovery of heavy oil and bitumens from hydrocarbon-containing reservoirs which allows for optimal (and continuous) control of $CO_2$, steam, and nitrogen by a reservoir engineer when same injected downhole to best produce oil from a particular well within a unique formation of specific viscosity, ambient temperature, porosity, permeability, and pressure, over time.

The above background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

An object of the present disclosure is to provide an apparatus, system, and method for controlling combustion gas output in direct steam generation for oil recovery, or alternatively for steam concrete curing.

In accordance with one aspect, the invention relates to a direct combustion steam generator comprising: (a) a combustion container comprising an inner wall defining a combustion chamber, the combustion container having a first end comprising a burner for producing a flame within the combustion chamber for carrying out combustion of a fuel and an oxygen-containing gas mixture to produce combustion products comprising steam, $CO_2$, and $N_2$, and a second end comprising an outlet through which the combustion products exit from the combustion chamber; (b) at least one fuel inlet at the first end of the combustion container, the fuel inlet located proximate the burner and configured to deliver the fuel to the burner at a delivery pressure exceeding atmospheric pressure; (c) at least one air inlet at the first end of the combustion container, the air inlet located proximate the burner and configured to deliver air to the burner at a delivery pressure exceeding atmospheric pressure, wherein the air contributes to the oxygen-containing gas mixture; and (d) at least one oxygen inlet at the first end of the combustion container, the oxygen inlet located proximate the burner and configured to deliver a supply of supplemental oxygen to the burner at a delivery pressure exceeding atmospheric pressure, wherein the supplemental oxygen is supplied to the burner to adjust the oxygen content of the oxygen-containing gas mixture, whereby the composition of the combustion products produced in the combustion chamber will accordingly be adjusted to thereby provide various ratios and amounts of nitrogen relative to the amounts of $CO_2$. Specifically the composition of exhaust gas adapted to be generated may advantageously range using the apparatus of the present invention from 0% nitrogen being produced and 88% of the exhaust from the generator being $CO_2$ and 12% steam (where a stochiometric quantity of pure oxygen is provided), to a situation where only air is provided but in quantities of air to supply a stochiometric supply of oxygen, and an exhaust gases being generated in such circumstances which are then 71.8% nitrogen, 18% $CO_2$, and 9.9% steam.

In another broad aspect of the invention, the invention comprises direct combustion steam generator adapted to burn a hydrocarbon fuel therein in which a byproduct of such combustion is water in the form of steam, comprising:
(a) a combustion container comprising an inner wall defining a combustion chamber, the combustion container having a first end comprising a burner for producing a flame within the combustion chamber for carrying out combustion of a fuel and an oxygen-containing gas mixture to produce combustion products comprising at least steam, $CO_2$, and at desired times $N_2$, and a second end comprising an effluent outlet through which the combustion products exit from the combustion chamber in an effluent stream;
(b) at least one fuel inlet at the first end of the combustion container, the fuel inlet located proximate the burner and configured to deliver the fuel to the burner at a delivery pressure exceeding atmospheric pressure;
(c) at least one air inlet at the first end of the combustion container, the air inlet located proximate the burner and configured to deliver air to the burner at a delivery pressure exceeding atmospheric pressure; (d) at least one supplemental oxygen inlet at the first end of the combustion container, the supplemental oxygen inlet located proximate the burner and configured to deliver a supply of supplemental oxygen having a percentage of nitrogen therein less than air and comprising up to 100% pure oxygen to the burner, wherein the supplemental oxygen contributes to or comprises the oxygen-containing mixture;
(e) a flow regulator means for adjusting a rate of flow of air through the at least one air inlet relative to a rate of flow of said supplemental oxygen through said at least one oxygen inlet, to thereby adjust an amount of oxygen in said oxygen-containing gas mixture being supplied to said burner; an air flow control valve which regulates flow and quantum of air supplied to said combustion container via said at least one air inlet;
wherein a proportion or amount of said one or more combustion products produced in the combustion chamber which form said effluent stream is adjustable by use of said flow regulator means.

Advantageously, a well operator who is controlling a well that is using gases generated by the steam generator of the present invention may adjust the ratio to provide up to 88% $CO_2$ and 18% steam to reduce viscosity of oil in the formation. Also advantageously, where less $CO_2$ but greater amounts of inert pressurizing gas are required, by using the steam generator device of the present invention allows altering the exhaust gas make-up, by providing only air to the steam generator device which in such circumstances will then allow the provision of exhaust gases comprising up to 71.8% $N_2$ when pressurization of the formation for a time is required for a time to optimize output as opposed to reducing viscosity of oil in such formation.

Likewise advantageously, where the exhaust gases of the steam generator of the present invention are alternatively desired for steam curing of concrete (which is useful in cold climates), the generator of the present invention can be used to promote carbon dioxide ($CO_2$) and steam concrete curing.

In this regard, concrete strength increases with age as long as moisture (saturated steam), $CO_2$, and heat are present for hydration of cement. Two distinct types of concrete carbonation are used:
(a) natural weathering carbonation, which is relevant to mature concrete over an extended period of time when it is exposed to the atmosphere, and
(b) steam and carbon dioxide ($CO_2$) carbonation, which increases carbon dioxide ($CO_2$) by Oxygen ($O_2$) addition, promotes early age carbonation, which involves fresh concrete at very early ages (starting as early as immediately after mixing and ending prior to, or in line with, the conclusion of accelerated curing, as much as 48 hours later).

Accordingly, using a steam generator of the present type allows adjustment of the exhaust gases to maximize $CO_2$ production thereof by injecting pure $O_2$ without injecting air, so as to with the approximately 88% $CO_2$ and high carbonization thereby:
(1) increase in masonry plant productivity, thereby saving time and total cost of concrete blocks;
(2) reduction of dimensional movement and water absorption;
(3) reduction in the release of combustion emissions;
(4) improve compressive strength of the concrete; and (5) obtain an energy savings, where the exhaust gas generating device of the present invention utilizes natural gas or propane as a fuel source.

In accordance with another aspect of the present invention, the present invention relates to a direct combustion steam generator comprising: (a) a combustion container comprising an inner wall defining a combustion chamber, the combustion container having a first end comprising a burner for producing a flame within the combustion chamber for carrying out combustion of a fuel and an oxygen-containing gas mixture to produce combustion products comprising steam, $CO_2$, and $N_2$, and a second end comprising an outlet through which the combustion products exit from the combustion chamber; (b) at least one fuel inlet at the first end of the combustion container, the fuel inlet located proximate the burner and configured to deliver the fuel to the burner at a delivery pressure exceeding atmospheric pressure; (c) at least one air inlet at the first end of the combustion container, the air inlet located proximate the burner and configured to deliver air to the burner at a delivery pressure exceeding atmospheric pressure, wherein the air contributes to the oxygen-containing gas mixture; (d) at least one oxygen inlet at the first end of the combustion container, the oxygen inlet located proximate the burner and configured to deliver a supply of supplemental oxygen to the burner at a delivery pressure exceeding atmospheric pressure, wherein the supplemental oxygen is supplied to the burner to adjust the oxygen content of the oxygen-containing gas mixture, whereby the composition of the combustion products produced in the combustion chamber can be adjusted; and (e) at least one water inlet operatively connected to the combustion chamber and configured to deliver a supply of water onto the inner wall of the combustion chamber to cool the temperature of the combustion chamber and to adjust the quality of the steam generated by the combustion.

In accordance with a further aspect, there is described a system for steam assisted oil recovery in a hydrocarbon-containing reservoir, comprising the direct combustion steam generator according to embodiments of the present disclosure, the steam generator configured to produce combustion products from a supply of fuel, air, supplemental oxygen, and water, wherein the steam generator is coupled to convey the combustion products into an injection well in the reservoir, and wherein the composition of the combustion products is controllably adjusted in response to the conditions of the reservoir by altering the supply of the supplemental oxygen.

In accordance with another aspect, there is described a method of steam assisted oil recovery from a hydrocarbon-containing reservoir, comprising: (a) providing the direct combustion steam generator according to embodiments of the present disclosure; (b) delivering a fuel and an oxygen-containing gas mixture to the combustion steam generator at a pressure exceeding atmospheric pressure, wherein the oxygen-containing gas mixture can be provided by a supply of air delivered to the combustion steam generator; (c) delivering a supply of supplemental oxygen to the combustion steam generator at a delivery pressure exceeding atmospheric pressure, wherein the supplemental oxygen is supplied to the combustion steam generator to adjust the oxygen content of the oxygen-containing gas mixture; (d) burning the fuel and the oxygen-containing gas mixture in the direct combustion steam generator to generate combustion products comprising steam, $CO_2$, and $N_2$; and (e) injecting the combustion products into an injection well; wherein the ratio of $CO_2$ to $N_2$ produced in the combustion products can be adjusted by adjusting the supply of supplemental oxygen delivered to the combustion steam generator.

Advantages of an above combustor and method for enhanced oil recovery include, but are not limited to:

1) Because the burner can operate on oxygen or air or any ratio of the two, it gives the petroleum engineer a new set of tools to control and optimize recovery from oil field formations using SAGD-type recovery processes;
2) Because all products of combustion go down the SAGD well in accordance with the method of the present invention, the burner produces no atmospheric $CO_2$;
3) No heat is lost to the atmosphere as with a normal boiler where heat goes up the stack;
4) No atmospheric $NO_x$'s are produced because all components go down the SAGD well; and
5) Should heavy oil be used as a fuel no $SO_2$ will go into the atmosphere because all exhaust components go into the SAGD well.

BRIEF DESCRIPTION OF THE DRAWINGS

These and other features of the invention will become more apparent in the following detailed description in which reference is made to the appended drawings.

DETAILED DESCRIPTION OF THE INVENTION

Definitions

Figure 1:
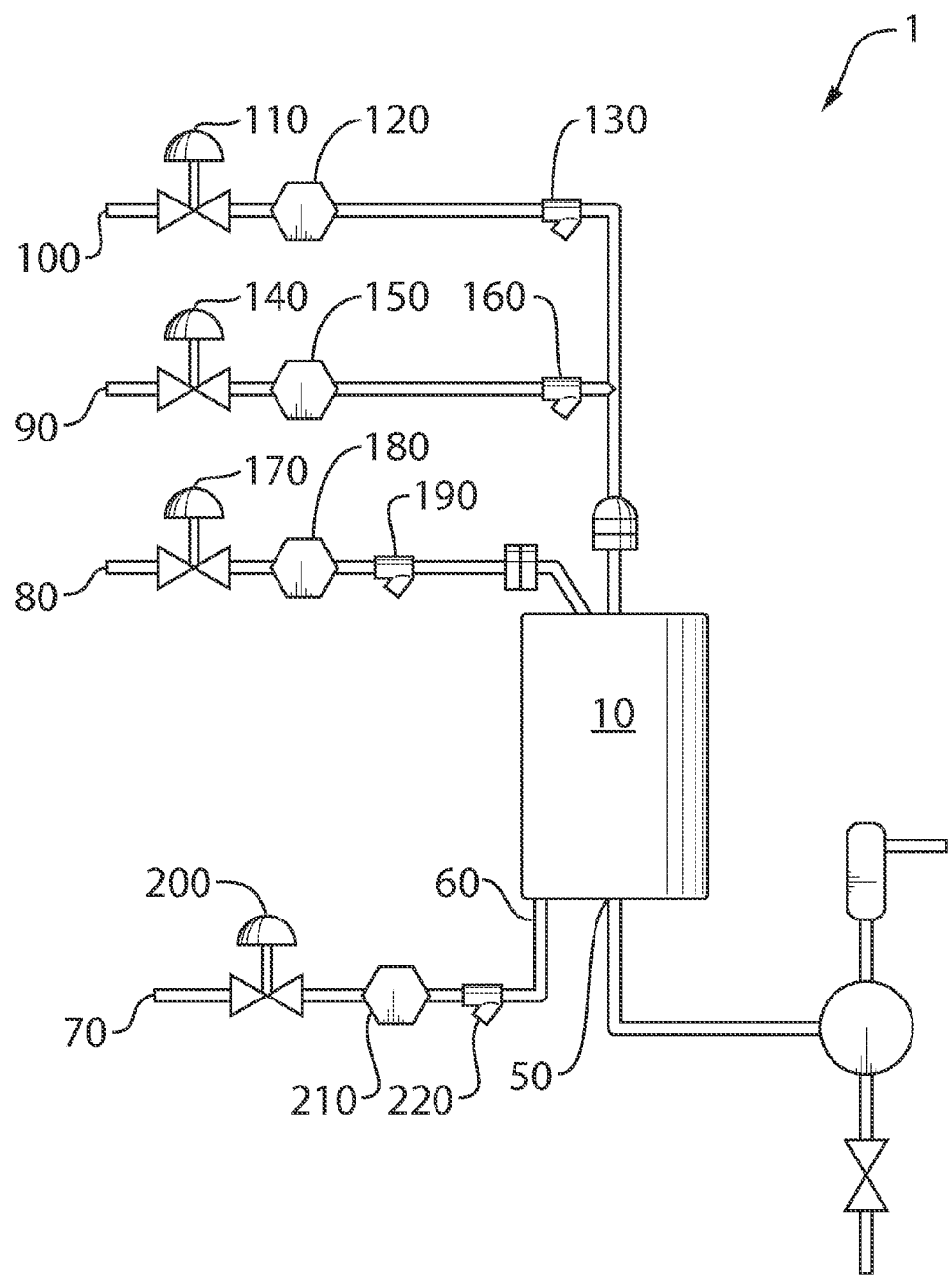
FIG. 1 is a schematic representation of a direct combustion steam generator for controlling combustion gas output in direct steam generation, according to embodiments of the present disclosure.

Unless defined otherwise, all technical and scientific terms used herein have the same meaning as commonly understood by one of ordinary skill in the art to which this invention belongs.

As used herein, the term "hydrocarbon-containing reservoir", refers to subterranean formations that are explored and exploited for hydrocarbon resources through drilling and extraction techniques.

As used herein, the term "about" refers to an approximately +/−10% variation from a given value. It is to be understood that such a variation is always included in any given value provided herein, whether or not it is specifically referred to.

Steam injected into a hydrocarbon-containing reservoir facilitates heavy oil and bitumen flow in two ways—reducing its viscosity by heating it, and increasing the pressure in the reservoir to help it flow. As the steam cools, however, it condenses back to a liquid state which results in a decline in pressure and inefficiency in production. Co-injection of a non-condensable gas with the steam can further enhance the oil recovery and compensate for this decline. For example, injected nitrogen ($N_2$) gas can expand in the reservoir to create increased pressure that pushes or drives oil to a production wellbore. Other gases, such as $CO_2$, are miscible in the oil i.e., dissolve in the oil, to further lower the viscosity of the oil and improve its flow rate.

The combustion products derived from direct steam generation techniques can include $N_2$ and/or $CO_2$ depending on the burner oxidant used with the fuel. When fuels are burned with air, $N_2$ forms part of the combustion product mixture, as illustrated by the exemplary equation using methane as the example fuel:

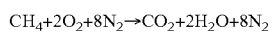

$$CH_4 + 2O_2 + 8N_2 \rightarrow CO_2 + 2H_2O + 8N_2$$

When combustion is carried out in pure oxygen (i.e. no air and thus absence of nitrogen), only $CO_2$ and $H_2O$ are produced and provided to the effluent combustion stream, as illustrated by the below formula:

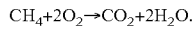

$$CH_4 + 2O_2 \rightarrow CO_2 + 2H_2O.$$

The ratio of $CO_2$ to $N_2$ in the combustion products is controlled in the present invention by controlling the amount of pure oxygen in relation to the air input into the direct steam generator for combustion with the fuel. Typically, the required level of oxygen is provided as air, pure oxygen, or air with a pre-determined level of oxygen enrichment.

In the prior art, there was little ability to adjust the ratio of $CO_2$ to $N_2$ within the produced combustion products, as the ratio of $N_2$ to $O_2$ in air is typically a fixed ratio of about 3.25:1, with normal air comprising 75.5% nitrogen gas (by weight) and 23.2% oxygen gas (by weight), namely a ratio of 3.25:1. Thus to maintain complete combustion (i.e., supply oxygen gas to the fuel in required stoichiometric relation) associated quantity of nitrogen was supplied to the steam generator in a fixed ratio. Thus any steam generation units having only air supply were not amenable to allow adjustment of the ratio of produced $CO_2$ to $N_2$ during enhanced oil recovery (EOR), and thus had no ability to optimize and vary, for a given well and given formation conditions, the amount of viscosity reduction (via $CO_2$ injection) in relation to the amount of pressure increase provided by the injection of $N_2$.

More particularly, the phase behavior of the combustion gas mixtures and the heavy oil are strongly dependent on reservoir conditions such as temperature, pressure, and heavy oil composition. For example, in high pressure applications with lighter oils, $CO_2$ is miscible with the oil, with resultant swelling of the oil, and reduction in viscosity, and possibly also with a reduction in the surface tension with the reservoir rock. In the case of low pressure reservoirs or heavy oils, $CO_2$ will form an immiscible fluid, or will only partially mix with the oil. Some oil swelling may occur, and oil viscosity can still be significantly reduced. The ability to adjust the ratio of $CO_2$ to $N_2$ in response to the changing conditions of the reservoir can, therefore, be beneficial to the efficiency of EOR (enhanced oil recovery).

In prior art methods, the manner of regulating the amount of $CO_2$ to $N_2$ injected in a formation has typically been through injection of either through a separate injector well. Drilling of a separate feeder well for injection of either of such gases was and is an expensive proposition, and an inexpensive and inefficient method to alter the proportion of $CO_2$ to $N_2$ being supplied to a formation.

The embodiments of the present disclosure provide a system and method for controlling the combustion gas output in combination with steam generation and combined injection, which control simultaneously allows for not only injection of steam and $CO_2$ to reduce viscosity of the oil but further allows for real-time adjustment of the ratio of $CO_2$ to $N_2$ ratio in response to the unique and sometimes changing pressure, temperature, viscosity, permeability, and porosity conditions of the reservoir.

An embodiment of the present disclosure will now be described by reference to FIGS. 1 and 2, which show a schematic representation of a direct combustion steam generator of the present disclosure.

Figure 2:
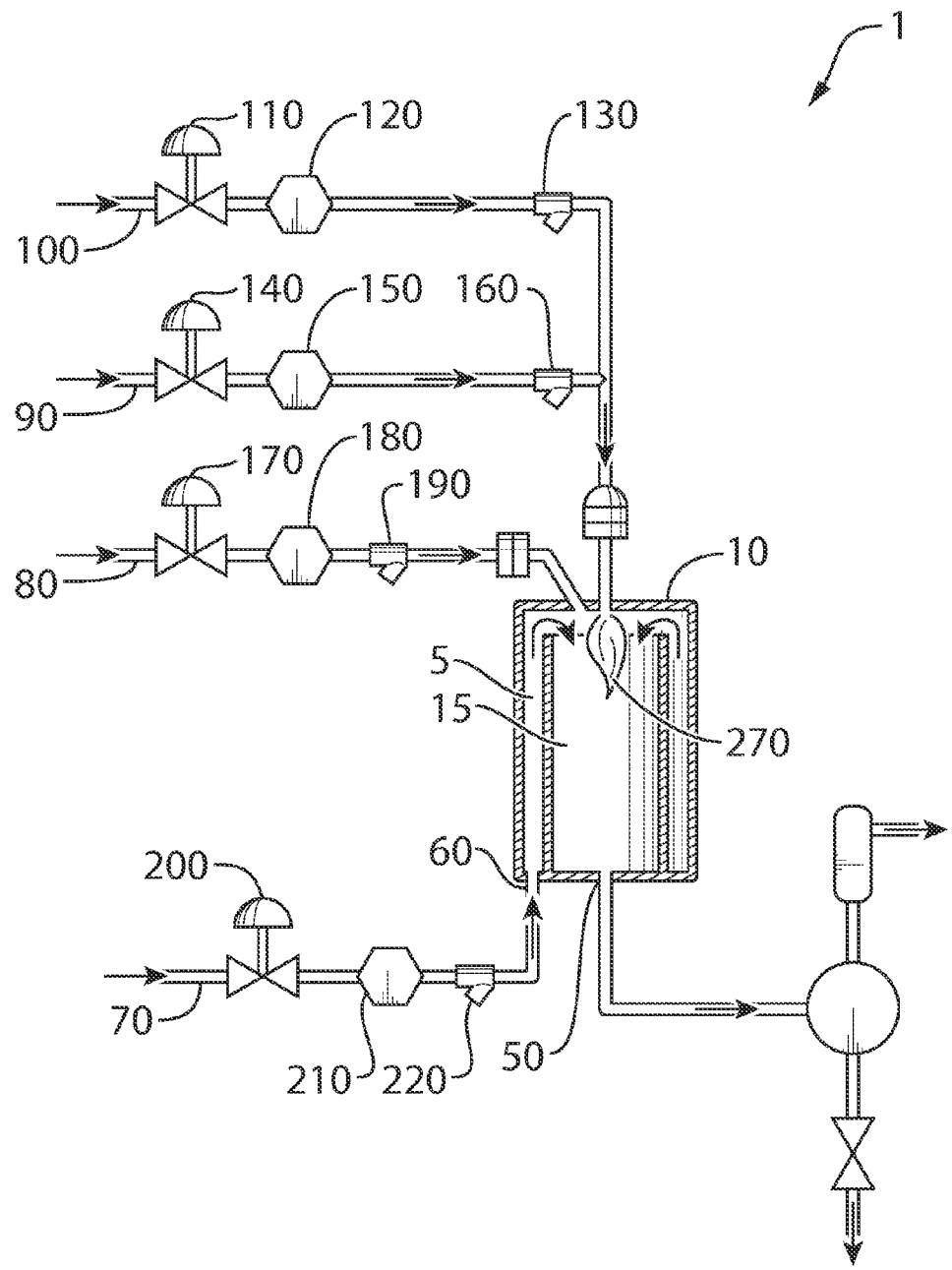
FIG. 2 is a cross-sectional view of the direct combustion steam generator represented in FIG. 1, according to embodiments of the present disclosure.

Referring to FIGS. 1 and 2, a steam generator 1 of the present disclosure comprises a combustion container 10 having an inner wall defining a combustion chamber 15. The combustion container 10 includes a burner (not shown) for producing a flame 270 within the combustion chamber 15 for carrying out combustion of a fuel and an oxygen-containing gas mixture to produce combustion products that comprise steam, $CO_2$, and $N_2$. The combustion products exit the combustion chamber 15 through an outlet 50 at the opposite end of the combustion container 10 for injection into a hydrocarbon-containing reservoir, for example.

Controlling Combustion Gas Output in Direct Steam Generation—Real-Time Oxygen Enrichment As discussed, when fuels are burned with air, only about 21% of the air, that is oxygen, is consumed in the combustion reaction, leaving about 79% of the air to remain as mostly inert $N_2$ (by volume). When combustion is carried out in pure oxygen, on the other hand, only $CO_2$ and $H_2O$ is the resulting combustion product. The ratio of $CO_2$ to $N_2$ in the combustion products can thus be controlled by the amount of oxygen input in relation to air which is input into the combustor for combustion with the fuel, which when water is further injected produces an effluent stream containing saturated or superheated steam and $CO_2$, with the amount of $N_2$ gas being variable for optimized control of pressurization of the formation in relation to $CO_2$ being injected.

As illustrated in FIGS. 1 and 2, the fuel and oxygen-containing gas enter the combustion container 10 and mix in a combustion area of the burner for the steam generator 1 and are ignited. Fuel is supplied through at least one fuel inlet 90 proximate the burner and configured to deliver the fuel to the burner at a delivery pressure exceeding atmospheric pressure. According to embodiments of the present disclosure, the fuel can be any hydrocarbon-containing mixture, for example heavy oil, methane, propane, natural gas liquids, and/or naphtha. In certain embodiments, the fuel supply is pressurized through a compressor.

The composition of the oxygen-containing gas that combusts with the fuel will depend on the particular reservoir conditions and the desired levels of $CO_2$ and $N_2$ required for EOR. According to embodiments of the present disclosure, the steam generator 1 comprises at least one air inlet 100 proximate the burner and configured to deliver air to the burner at a delivery pressure exceeding atmospheric pressure. In certain embodiments, the air supply is pressurized through a compressor. According to embodiments of the present disclosure, as shown in FIG. 1, the fuel inlet 90 is fluidly connected to the air inlet 100 to deliver a mixture of fuel and air to the burner.

The steam generator 1 further comprises at least one oxygen inlet 80 located proximate the burner and configured to separately deliver a supply of supplemental oxygen to the burner at a delivery pressure exceeding atmospheric pressure. As shown in FIGS. 1 and 2, the supplemental oxygen inlet 80 is configured to supply supplemental $O_2$ to the burner after the fuel and air is injected into the burner. In this way, the supplemental oxygen can be controllably added throughout any particular combustion process to adjust the oxygen content of the oxygen-containing gas mixture as needed. Moreover, the supplemental $O_2$ can be added in response to the changing conditions of the reservoir. The addition of supplemental $O_2$ can, therefore, be controlled and added to a combustion process in real-time to adjust the composition of the combustion products produced.

The $O_2$ delivered through the oxygen inlet 80 can be supplied from commercial containers, or by pipeline, or in situations where feasible, can be prepared by a physically adjacent air separation unit. According to such embodiments, air enters an air separation unit to separate out $O_2$ from other components of the air and to provide a compressed supply of $O_2$ for delivery through the supplemental oxygen inlet 80. Air separation can be carried out by any number of techniques known in the art, for example, by cryogenic fractional distillation or by $O_2$ pressure swing adsorption (PSA).

According to embodiments of the present disclosure, as shown in FIG. 1, the air inlet 100, fuel inlet 90, and oxygen inlet 80 each comprise a control means to control the fluid flow into the burner. The control means can include, for example, any combination of a control valve 110, 140, 170, a flow meter 120, 150, 180, and/or a check valve 130, 160, 190. According to certain embodiments, each control means can be controlled by a programmable controller.

By offering the ability to control the combustion gas output, the steam generator 1 of the present disclosure allows supplemental $O_2$ to be added to the fuel at various concentrations. In certain embodiments, it may be desirable to input air as the oxygen-containing gas. In such embodiments, supplemental $O_2$ is not input into the steam generator 1. In further embodiments, it may be desirable to input pure $O_2$ as the oxygen-containing gas. In such embodiments, air is not input into the steam generator 1. The desired $O_2$ content of the oxygen-containing gas can be determined at the discretion of the operator of any given EOR operation.

In certain embodiments, supplemental $O_2$ can be added in relation to the quantum of air supplied to increase the $CO_2$ content in the effluent stream, under stoichiometric conditions (where no supplemental $H_2O$ is added for steam generation) from a minimum of ~20% (by weight) with no supplemental oxygen added and only air being supplied, to a maximum of ~65% (by weight) with substantially pure oxygen and no air being supplied, where for example propane is used as the fuel.

Similarly and correspondingly, the ratio of air to supplemental $O_2$ added to the fuel can be controlled to reduce the $N_2$ content of the combustion gas output to anywhere from ~72% $N_2$ (by weight, using a weight ratio of 75.47 nitrogen/23.2 oxygen, with no supplemental $O_2$ being supplied) to 0% $N_2$. For example, by supplying 33.3% (by weight) pure oxygen and 66.6% (by weight) air to the combustor, the $N_2$ content of the resultant combustion gas (where for example propane is the fuel utilized) can be reduced from 72% to 63% (by weight) while the $CO_2$ quantum in the effluent is correspondingly increased from 18% to about 24% (by weight) (when no water is added to the combustor to produce additional steam.

Direct Steam Generation—Steam Quality Adjustment

As shown in FIGS. 1 and 2, the direct combustion steam generator 1, further comprises at least one water inlet 60 operatively connected to the combustion chamber 15 and configured to deliver a supply of water 70. According to certain embodiments, the water inlet 60 is configured to deliver the water through an inner annulus 5 formed with the inner wall about the circumference of the combustion container 10. The water enters the bottom end of the annulus to cool the inner wall of the combustion chamber 15 and spray over the top of the inner annulus 5 in direct contact and fluid communication with the combustion area of the flame. In this way, the temperature of the combustion chamber 15 as well as the steam output temperature can be managed.

Transfer of heat from the flame to the water introduced through the water supply 70 into the steam generator 1 vaporizes the water into steam. Further, combustion of the fuel and the oxygen-containing gas also generates vaporized water. Thus, quantity of the steam made exceeds quantity of water input into the steam generator 1 since the steam includes vaporized water resulting from combustion of the fuel and the oxygen-containing gas mixed with the water inputted and heated. The quantity of the steam made and output through the outlet 50, therefore, exceeds the quantity of water input into the steam generator 1 from the water supply 70. For example, flow rate of water (steam) output may be between about 20% and 25% greater than flow rate of water input through the water supply 70. According to some embodiments, this increase in water may be sufficient to enable net water production within the steam generator 1 such that the steam generator 1 is self contained for water needs.

According to certain embodiments, the water inlet 60 includes control means to control the water flow into the combustion chamber 15. The control means can include, for example, any combination of a control valve 200, a flow meter 210, and/or a check valve 220. According to certain embodiments, each control means can be controlled by a programmable controller.

Steam production, therefore, can be subjected to quality adjustment. For example, the amount of water input into the combustion process can be controlled according to the embodiments described. In other embodiments, for example, the water may be preheated. In this way, the properties of the generated steam can be adjusted to the particular requirements of a given hydrocarbon-containing reservoir.

Direct Combustion Steam Generation Process for Enhanced Oil Recovery

Figure 3:
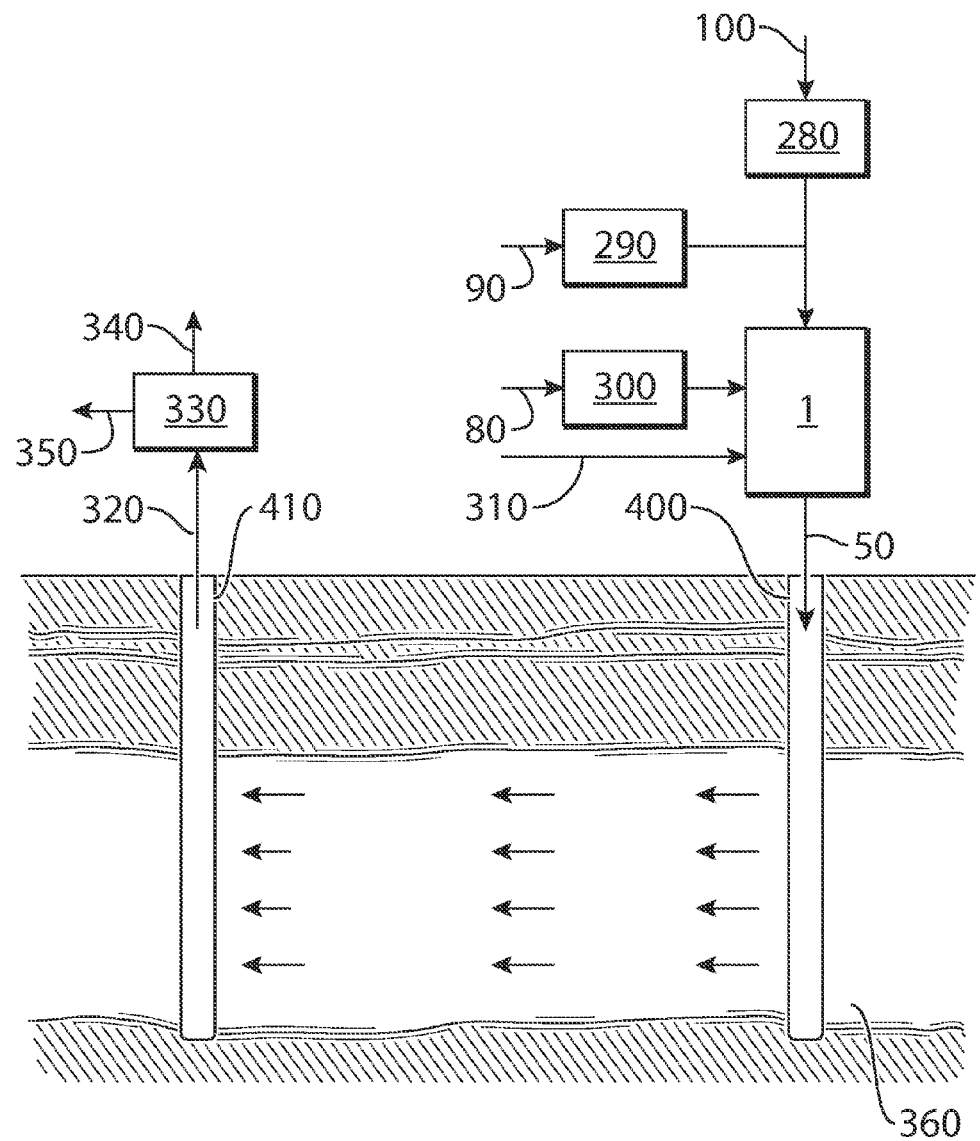
FIG. 3 is a schematic of the direct combustion steam generator illustrated in FIG. 1, applied to vertical well steam flood type enhanced oil recovery (EOR), according to embodiments of the present disclosure.
Figure 4:
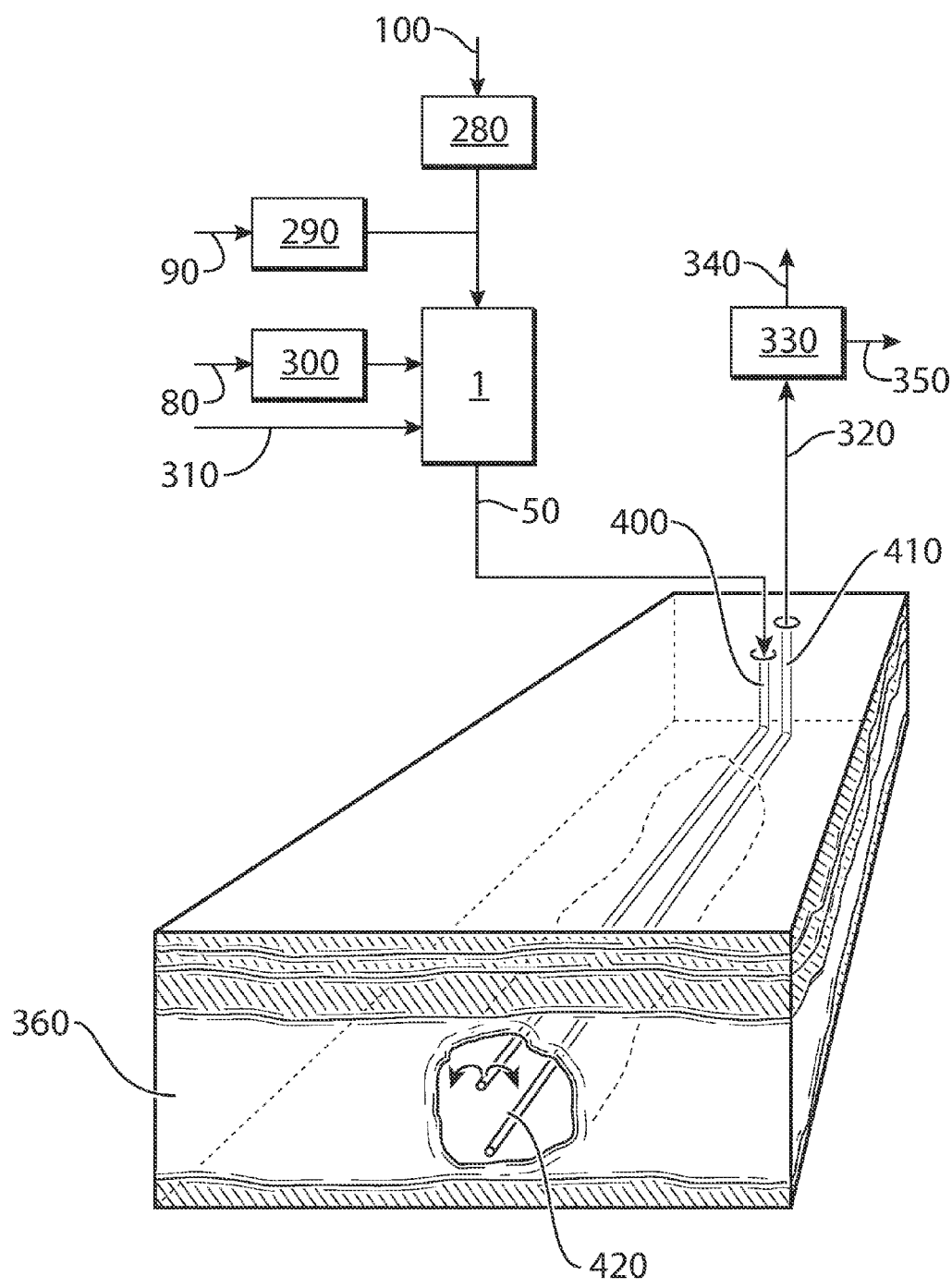
FIG. 4 is a schematic of the direct combustion steam generator illustrated in FIG. 1, applied to horizontal well SAGD enhanced oil recovery (EOR), according to embodiments of the present disclosure.
Figure 5:
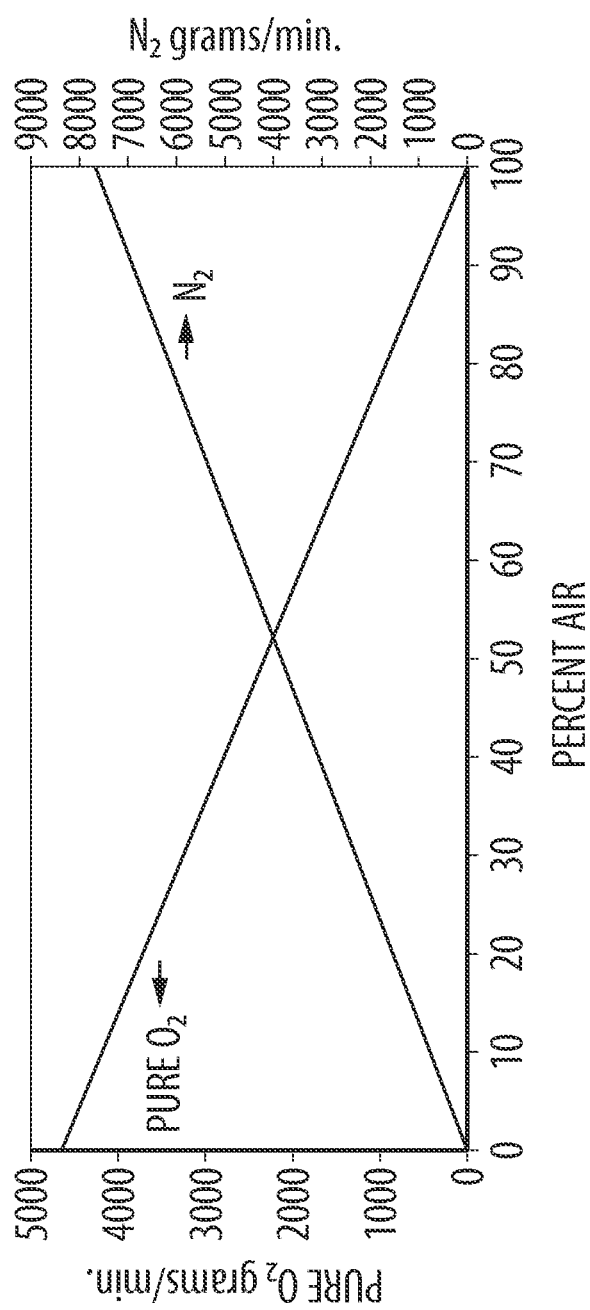
FIG. 5 shows, in terms of control of the supply of air relative to the supply of pure or substantially pure oxygen, the relationship necessary to maintain stoichiometric (complete) combustion, and in particular the relationship between such two parameters followed in the Examples.

As illustrated in FIGS. 3 and 4, in a steam assisted enhanced oil recovery (EOR) operation, the outlet 50 directs steam and combustion product output from the steam generator 1 at a pressure greater than about 450 psig, for example, into an injection well 400 to fluidize the hydrocarbon-containing reservoir 360. The steam from the output eventually condenses to create an oil/water mixture that migrates through the reservoir 360. The oil/water mixture is gathered at the production well 410 through which the oil/water mixture is recovered to surface via production line 320. In embodiments applied to SAGD operations (FIG. 4), the injection well 400 includes a horizontal borehole portion that is disposed above (e.g., 4 to 6 meters above) and parallel to a horizontal borehole portion of the production well 410. A separator 330 separates the oil/water mixture within the production line 320 and provides an oil product 340 and recovered water 350, which according to some embodiments can be recycled.

In the embodiments shown in FIGS. 3 & 4, and similar to the numerical references earlier referred to in FIGS. 1-2, air flow inlet 100 communicates with steam generator 1, having air control valve 280 thereon for regulating flow and quantum of air entering steam generator 1. Similarly, line 90 designates the fuel flow inlet to steam generator 1, having fuel control valve 290 thereon for regulating flow and quantum of fuel entering steam generator 1. Likewise, line 80 is the supplemental oxygen flow inlet to steam generator 1, having oxygen control valve 300 thereon for regulating flow and quantum of oxygen entering steam generator 1. Lastly, line 310 is a water supply line for providing water to steam generator 1, for purposes previously described, namely for changing the quality and/or amount of superheated steam being supplied by steam generator 1 in effluent stream 50 and/or cooling the combustion container 10 of steam generator 1 as shown in FIG. 2.

As discussed, the co-injection of combustion gases, $CO_2$ and/or $N_2$, with steam can increase oil production rates significantly. The effective ratio of $CO_2$ and/or $N_2$ for oil recovery of a given hydrocarbon-containing reservoir will depend on the reservoir conditions which can change during the oil recovery operation. According to embodiments of the present disclosure, this ratio of $CO_2$ to $N_2$ produced in the combustion products can be adjusted by adjusting the level of supplemental oxygen supplied to the combustion steam generator 1 to adjust the oxygen content of the oxygen-containing gas mixture burned with the fuel to generate the combustion products comprising steam, $CO_2$, and $N_2$.

According to certain embodiments, the conditions of the reservoir are monitored during the oil recovery operation to determine the amount of supplemental oxygen to deliver to the combustion steam generator throughout the process. In this way, adjustments to the ratio of steam and combustion products (i.e., ratio of $CO_2$ and $N_2$) can be made in real-time during the oil recovery process in response to the changing conditions of the reservoir in order to maximize oil production.

Direct Combustion Steam Generator and Process for Enhanced Oil Recovery Using Control of Each of Fuel, Air, Supplemental Oxygen, and Water Supplied by Steam Generator to Control Amounts of $CO_2$, $N_2$, and Amount and Degree of Superheated Steam Produced In a further refinement, it is often desirable to further be able to control not only the ratio of $CO_2$ to $N_2$ produced by the resultant combustion gas, but to further control the quality of steam within such combustion gases and also the degree of superheating, if desired, of such steam within such combustion gases. This can be done by further controlling the rate of fuel input, as well as the rate of water input which is converted to steam. Some $H_2O$ may also appear in the combustion byproduct, due to humidity of air if air is used instead of pure oxygen.

For example, for a given hydrocarbon fuel $C_xH_y$, burning of such fuel will liberate a quantity of heat $\Delta H_{(heat\ of\ combustion)}$, as per the below formula:

$$C_xH_y + a(O_2 + 3.25N_2) \rightarrow xCO_2 + (y/2)H_2O + 3.25aN_2 + \Delta H_{(heat\ of\ combustion)}, \text{ where } a = x + y/4$$

For a situation where a percentage P of oxygen supplied and (1−P) is the corresponding percentage of air supplied, such equation becomes:

$$C_xH_y + PO_2 + (1-P)a(O_2 + 3.25N_2) \rightarrow xCO_2 + (y/2)H_2O + 3.25(1-P)aN_2 + \Delta H_{(heat\ of\ combustion)}, \text{ where } a = x + y/4$$

Conversely, addition of water to the combustor, which vaporizes due to the presence of heat in the combustor, will absorb heat due to the latent heat of vaporization $\Delta H_{(heat\ of\ vaporization)}$.

In controlling the rate of fuel supplied to the combustor, the net heat balance need always be exothermic [and thus a specific amount of fuel, oxygen (in the form of a specific desired ratio of air to supplemental oxygen), as well as the rate of input of the water Q] must all be adjusted relative to each other to allow stoichiometric combustion requirements for optimum combustion and so that the resultant heat is ultimately positive so that all water supplied is turned to steam in at least a saturated state, as shown below:

$$C_xH_y + PO_2 + (1-P)a(O_2 + 3.25N_2) + QH_2O_{(liquid)} \rightarrow xCO_2 + (y/2)H_2O + 3.25aN_2 + QH_2O_{(gas)} + \Delta H_{(heat\ of\ combustion)} - \Delta H_{(heat\ of\ vaporization)} \geq 0$$

where $\Delta H_{(heat\ of\ vaporization)} = Q_{(unit\ of\ volume/time)} \times \text{Latent heat of vaporization}_{(unit\ of\ heat/unit\ time)} \times \text{Time}_{(unit\ of\ time)}$ To the extent that the heat balance is positive for the above equation, assuming all supplied components are supplied at 100° C., is greater than zero, such will provide a degree of superheating to the steam.

Accordingly, in a preferred embodiment as shown in FIG. 1, the steam generator 1 of the present invention and the method of the present invention utilize control valves 140, 110, 170, and 200 situated respectively on each of the supply of the fuel, air, supplemental oxygen, and water which are each separately supplied to the steam generator 10, to further allow such additional control capability of each of such constituents to allow the degree of superheating, quality of steam in the effluent, and the ratio of $CO_2$ to $N_2$ in the resultant produced gaseous effluent stream.

Thus in a preferred embodiment (see FIG. 2) the present invention comprises a combustor 10, having a separate fuel supply inlet 90, an air supply inlet 100, a substantially pure oxygen supply inlet 80, and a water supply inlet 70, each controlled by valves 140, 110, 170, and 200 respectively to allow variation of the rate of supply of each of the foregoing to the combustor 1. In a further preferred embodiment, such valves 140, 110, 170, and 200 are automated valves which may be individually electrically, hydraulically, or pneumatically controlled to allow individual variation of the rate of supply of each of the fuel, air, supplemental oxygen, and water to the combustor unit 10.

Thus in a further embodiment the present invention comprises a process 1 for supplying steam and carbon dioxide to a formation using a combustor 10 for creating and supplying an effluent gas stream containing steam and carbon dioxide to an underground formation 360, the process comprising adjusting the rate, via valves 140, 110, 170, and 200 on the respective lines of supply of each of fuel 90, air 100, supplemental oxygen 80, and water 70 to said combustor 10, during injection of said effluent gas stream into an underground formation 360 to heat and reduce the viscosity of oil and/or bitumen in such underground formation 360.

To gain a better understanding of the invention described herein, the following examples are set forth. It will be understood that these examples are intended to describe illustrative embodiments of the invention and are not intended to limit the scope of the invention in any way.

EXAMPLES

Example 1: Controllable Combustion Gas Output

The combustion products generated by the steam generator of the present disclosure were determined over a range of $O_2$ and air feeds that were combusted with a hydrocarbon-containing fuel, in this case being propane as the model fuel, although clearly any alternative readily available fuel may be used, such as methane or natural gas. The steam generator was operated at a pressure of 45 psig. and 292° F. Stoichiometric ratios of the feeds were maintained. The results are presented in Table 1.

TABLE 1

Controllable Production of Combustion Product

| Input Flow Rate (grams per minute) | | | | Output Flow Rate (grams per minute) | | |
|---|---|---|---|---|---|---|
| Oxygen | Propane | Air | Water | $CO_2$ | Steam | Nitrogen |
| 916 | 252 | — | 4640 | 755 | 5052 | — |
| — | 252 | 3931 | 4600 | 755 | 5000 | 3015 |
| 4581 | 1260 | — | 23200 | 3775 | 25262 | — |
| — | 1260 | 19655 | 23000 | 3775 | 25062 | 15074 |
| 3023 | 1260 | 8036 | 23135 | 3775 | 25197 | 5024 |
| 1527 | 1260 | 16073 | 23067 | 3775 | 25129 | 10,049 |

No CO or water was detected in the output, therefore total combustion was assumed and conversion of all injected water to steam (a) Propane Fuel with Substantially Pure Oxygen $$C_3H_8 + 5O_2 \rightarrow 3CO_2 + 4H_2O$$

On the first run 252 gm/min of propane and 916 gm/min of oxygen and were fed to the burner along with 4640 gm/min of water. This resulted in 5052 gm/min of saturated steam and 755 gm/min of $CO_2$. The mass ratio of $CO_2$/steam was 0.149, meaning that for every gram of water input into the steam generator 0.149 grams of $CO_2$ and no nitrogen is produced. The percent composition of the $CO_2$ in the effluent stream was (755/5052+755)=13% (by weight), with no $N_2$.

On the second run for the above reaction, 4581 gm/min of oxygen and 1260 gm/min of propane along with 23200 gm/min of water was fed to the burner. (The 4581 gm/min of oxygen is the stoichiometric mass of oxygen required for 1260 gm/min of propane). This resulted in 3775 gm/min of $CO_2$ and 25262 gm/min of saturated steam. The mass ratio of $CO_2$/steam was 0.149, and the percent composition of the $CO_2$ in the effluent stream was again 13% [i.e., 3755/(25262+3755)=13% (by weight)], with no $N_2$, the remainder being steam. This is a relatively high content of $CO_2$ in the effluent would be expected to significantly reduce the viscosity of heavy oil in EOR.

(b) Propane Fuel with Air $$C_3H_8 + 5(O_2 + 3.25N_2) \rightarrow 3CO_2 + 4H_2O + 5(3.25N_2)$$

On the first run 252 gm/min of propane and 3931 gm/min of air (i.e., slightly in excess of the stoichiometric requirement of air required of 3895 gm/min) were fed to the burner along with 4600 gm/min of water. This resulted in 5000 gm/min of saturated steam, 755 gm/min $CO_2$, and 3015 gm/min of nitrogen. The mass ratio of $CO_2$/steam was 0.151 and the mass ratio of nitrogen/steam was 0.603, indicating that with the use of air for combustion 4.0 (four) times as much $N_2$ as $CO_2$ is produced. This may be beneficial in EOR particularly if the hydrocarbon-containing formation needs pressure, however the percentage of $CO_2$ in the effluent stream dropped to 8.6% [755/(755+5000+3015)]=8.6% (by weight). Even if only a stoichiometric amount of air been supplied (3895 gm/min) for 252 gm/min propane, this would have stoichiometrically produced 2798 g/min N and 755 gm/min $CO_2$, such still would have resulted in nearly 3.7 times the amount of $N_2$ per amount of $CO_2$ produced (by weight) (2798/756=3.7)

On the second run 1260 gm/min of propane and 19655 gm/min of air (i.e., containing oxygen in the amount of 19655/3.25=6042 gm/min substantially in excess of the stoichiometric requirement of oxygen required of 4581 gm/min) were fed to the burner along with 23000 gm/min of water. This resulted in 25062 gm/min of saturated steam, 3755 gm/min $CO_2$, and 15074 gm/min of nitrogen. The mass ratio of $CO_2$/steam was 0.151 and the mass ratio of nitrogen/steam was 0.603, again indicating that with this proportion of air in relation the propane supplied four (4) times as much $N_2$ than $CO_2$ is produced in the effluent stream. This may be beneficial in EOR particularly if the hydrocarbon-containing formation needs pressure, however the percentage of $CO_2$ in the effluent stream dropped to 8.6% [755/(755+5000+3015)]= 8.6% (by weight) as compared to 13% when pure oxygen was used. Even if only a stoichiometric amount of air been supplied (4581 gm/min) for 1260 gm/min propane, this would have stoichiometrically produced 14,888 g/min N (i.e., 3.25×4581 gm/min) and 3779 gm/min $CO_2$, such still would have resulted in nearly 3.9 times the amount of nitrogen per amount of $CO_2$ produced (by weight). (i.e., 14,888/3779=3.9)

(c) Propane Fuel with 1/3 Oxygen and 2/3 Air $$C_3H_8 + (1/3)5O_2 + (2/3)*5(O_2 + 3.25N_2) \rightarrow 3CO_2 + 4H_2O + 2*(5)/3(3.25N_2)$$

1527 gm/min of oxygen and 16073 gm/min of air (i.e., a total of 5255 gm/min oxygen which is in substantial excess of the stoichiometric amount of oxygen of 4582 g/min required for 1260 gm/min of propane) were fed to the burner along with 1260 gm/min of propane and 23067 gm/min of water. This resulted in 3775 gm/min of $CO_2$, 25129 gm/min of saturated steam, and 10,049 gm/min of nitrogen exhausting from the burner system. This gives a $CO_2$/steam ratio of 0.150 and a nitrogen/steam ratio of 0.518, with thus 3.45 times the mass of nitrogen being produced relative to the mass of produced $CO_2$. Even if only the amount of air to provide the stoichiometric total amount of oxygen required had been supplied (i.e. 4582 gm/min oxygen), this would have produced 9927 gm/min of N (and 3780 gm/min of $CO_2$), this would have resulted in 2.63 times the amount of $N_2$ to $CO_2$ (by weight). It is expected that this supplied mixture of 1/3 pure oxygen and 2/3 air would nonetheless pressurize a hydrocarbon-containing formation, but more slowly than using only air alone as shown above.

(d) Propane Fuel with 2/3 Oxygen and 1/3 Air $$C_3H_8 + (2/3)5O_2 + (1/3)5(O_2 + 3.25N_2) \rightarrow 3CO_2 + 4H_2O + 5/3(3.25N_2)$$

3023 gm/min of oxygen and 8036 gm/min of air (i.e. 3023+8036/3.25=5497 gm/min of oxygen) substantially in excess of the stoichiometric amount of oxygen required (4582 gm/min) for 1260 gm/min of propane, were fed to the burner along with 1260 gm/min of propane and 23135 gm/min of water. This resulted in 3775 gm/min $CO_2$, 25197 gm/min of saturated steam, and 5024 gm/min of $N_2$ exhausting from the system. This gave a $CO_2$/steam ratio of 0.150 and a $N_2$/steam ratio of 0.200, indicating that if 1/3 air to 2/3 pure oxygen is input into the system, only 1.33 times more $N_2$ as compared to $CO_2$ is produced. It is thus the situation that the formation in this instance would be pressurized with nitrogen less readily than in above example (c), but whose viscosity would be lessened more than in above example (c) due to the substantially higher percentage of end product $CO_2$ being injected into the formation.

What is claimed is:

1. A method of recovery of oil from a hydrocarbon-containing reservoir using steam, comprising:

(a) delivering a fuel and an oxygen-containing gas mixture to a direct combustion steam generator at a pressure exceeding atmospheric pressure, wherein a portion of the oxygen-containing gas mixture is provided by a supply of air delivered to the combustion steam generator;

(b) delivering a supply of supplemental oxygen to the combustion steam generator at a delivery pressure exceeding atmospheric pressure, wherein a portion of the oxygen-containing gas mixture is provided by said supplemental oxygen;

(c) burning the fuel and the oxygen-containing gas mixture in the direct combustion steam generator to generate an effluent stream comprising combustion products in the form of $CO_2$, and $N_2$ and water in the form of steam;

(d) sensing a presence of, or a quantity of, one or more of said combustion products, or a ratio of one of said combustion products to another of said combustion products, in said effluent stream;

(e) regulating, via one or more flow regulators, and without said effluent stream being recirculated to said combustion steam generator, a rate of said supplemental oxygen supplied to the combustion steam generator relative to a rate of said air supplied to said combustion steam generator to thereby adjust oxygen content of the oxygen-containing gas mixture so as to produce said effluent stream having a desired composition of one or more of said combustion products in said effluent stream; and (f) injecting the effluent stream into an injection well in said reservoir.

2. The method according to claim 1, further comprising delivering a supply of water to the combustion steam generator to add additional steam to said effluent stream produced by the combustion steam generator.

3. The method according to claim 1, wherein the method of recovery of oil from the reservoir is steam assisted gravity drainage (SAGD).

4. The method according to claim 1, wherein the method of recovery of oil from the reservoir is Cyclic Steam Stimulation (CSS).

5. The method according to claim 1, further comprising delivering a supply of water to the combustion steam generator to adjust the quality of the steam generated by the combustion steam generator.

6. The method according to claim 1, further comprising delivering a supply of water onto an inner wall of the combustion steam generator to cool the temperature of the inner wall of the combustion steam generator.

7. The method according to claim 6, further when delivering said supply of water to the combustion chamber further adjusting the quality of the steam generated by the combustion chamber.

8. The method according to claim 1, wherein the air is further supplemented by the supply of supplemental oxygen to adjust the oxygen content of the oxygen-containing gas mixture to a level sufficient to produce a combustion product having a ratio of $CO_2$ to $N_2$ that enhances the steam assisted recovery of oil from the hydrocarbon-containing reservoir.

9. The method according to claim 8, further comprising delivering a supply of water to the combustion steam generator to add additional steam to said effluent stream produced by the combustion steam generator.

10. The method according to claim 8, further comprising delivering a supply of water onto an inner wall of the combustion steam generator to cool the temperature of the inner wall of the combustion steam generator.

11. The method according to claim 8, further comprising delivering a supply of water to the combustion steam generator to adjust the quality of the steam generated by the combustion steam generator.

12. The method as claimed in claim 1, wherein said step of sensing a presence of, or a quantity of, one or more of said combustion products, or a ratio of one of said combustion products to another of said combustion products in said effluent stream, comprises sensing a ratio of $CO_2$ to $N_2$ in said effluent stream.

13. The method according to claim 12, further comprising delivering a supply of water to the combustion steam generator to add additional steam to said effluent stream produced by the combustion steam generator.

14. The method according to claim 12, further comprising delivering a supply of water to the combustion steam generator to adjust the quality of the steam generated by the combustion steam generator.

15. The method according to claim 12, further comprising delivering a supply of water onto an inner wall of the combustion steam generator to cool the temperature of the inner wall of the combustion steam generator.

16. The method according to claim 15, further when delivering said supply of water to the combustion chamber further adjusting the quality of the steam generated by the combustion chamber.

17. The method according to claim 15, further when delivering said supply of water to the combustion chamber further adjusting the quality of the steam generated by the combustion chamber.

18. The method as claimed in claim 12, further comprising monitoring conditions of the reservoir to determine an optimum ratio of $CO_2$ to $N_2$ in said combustion products for optimum production of hydrocarbon from said reservoir, and adjusting said one or more flow regulators to maintain said optimum ratio.

19. The method according to claim 18, further comprising delivering a supply of water to the combustion steam generator to adjust the quality of the steam generated by the combustion steam generator.

20. The method according to claim 18, further comprising delivering a supply of water to the combustion steam generator to add additional steam to said effluent stream produced by the combustion steam generator.

21. The method according to claim 18, further comprising delivering a supply of water onto an inner wall of the combustion steam generator to cool the temperature of the inner wall of the combustion steam generator.

* * * * *